(12) United States Patent
Sarata et al.

(10) Patent No.: US 8,153,320 B2
(45) Date of Patent: Apr. 10, 2012

(54) PRESSURE REGULATING VALVE, FUEL CELL SYSTEM USING SAME, AND HYDROGEN GENERATING FACILITY

(75) Inventors: Takafumi Sarata, Chiba (JP); Norimasa Yanase, Chiba (JP); Toru Ozaki, Chiba (JP); Tsuneaki Tamachi, Chiba (JP); Kazutaka Yuzurihara, Chiba (JP); Fumiharu Iwasaki, Chiba (JP); Noboru Ishisone, Chiba (JP)

(73) Assignee: Seiko Instruments Inc. (JP)

( * ) Notice: Subject to any disclaimer, the term of this patent is extended or adjusted under 35 U.S.C. 154(b) by 878 days.

(21) Appl. No.: 12/224,282

(22) PCT Filed: Feb. 15, 2007

(86) PCT No.: PCT/JP2007/052720
§ 371 (c)(1),
(2), (4) Date: Aug. 22, 2008

(87) PCT Pub. No.: WO2007/097243
PCT Pub. Date: Aug. 30, 2007

(65) Prior Publication Data
US 2010/0227241 A1 Sep. 9, 2010

(30) Foreign Application Priority Data
Feb. 24, 2006 (JP) .................. 2006-049334

(51) Int. Cl.
H01M 8/04 (2006.01)
(52) U.S. Cl. ...................... 429/443; 137/528
(58) Field of Classification Search .......... 429/443, 429/444, 446; 137/528, 505.3, 505.36, 505.29; 422/242
See application file for complete search history.

(56) References Cited

U.S. PATENT DOCUMENTS

| 7,790,325 B2* | 9/2010 | Shioya et al. | 429/444 |
| 2007/0056634 A1* | 3/2007 | Yokoi et al. | 137/505.29 |
| 2007/0160887 A1* | 7/2007 | Eickhoff | 429/32 |
| 2008/0014473 A1* | 1/2008 | Nakakubo | 429/13 |
| 2008/0038608 A1* | 2/2008 | Yoshida | 429/25 |

FOREIGN PATENT DOCUMENTS

| JP | 38017761 | 9/1963 |
| JP | 05025086 | 4/1993 |
| JP | 6295209 | 10/1994 |
| JP | 2002137903 | 5/2002 |
| JP | 2003167635 | 6/2003 |

(Continued)

*Primary Examiner* — Hae Moon Hyeon
(74) *Attorney, Agent, or Firm* — Adams & Wilks

(57) ABSTRACT

A pressure regulating valve comprises a first pressure deformation portion which receives a pressure on a fuel demand side, a second pressure deformation portion opposed to the first pressure deformation portion and which receives a predetermined pressure, first and second flow passages, and a communication passage for allowing the first and second flow passages to communicate with each other. The first and second flow passages and the communication passage are provided in a space between the first and second pressure deformation portions. A valve member has a connecting portion which extends through the communication passage and connects the first and second pressure deformation portions together, and has a valve element which is provided at the connecting portion and closes the communication passage when moved toward the second pressure deformation portion. When the pressure on the fuel demand side is lower than a predetermined value, the valve element does not close the communication passage, but when the pressure on the fuel demand side is equal to or higher than the predetermined value, the valve element closes the communication passage.

7 Claims, 8 Drawing Sheets

FOREIGN PATENT DOCUMENTS

| | | |
|---|---|---|
| JP | 2003186546 | 7/2003 |
| JP | 2004031199 | 1/2004 |
| JP | 2005129427 A * | 5/2005 |
| JP | 2005150090 | 6/2005 |
| JP | 2005183357 | 7/2005 |
| JP | 2005317515 | 11/2005 |
| JP | 2005347189 A * | 12/2005 |
| JP | 2007234501 A * | 9/2007 |

* cited by examiner (a)

(b)

(a)

(b)

(a)

(b)

PRESSURE REGULATING VALVE, FUEL CELL SYSTEM USING SAME, AND HYDROGEN GENERATING FACILITY

CROSS-REFERENCE TO RELATED APPLICATION

This application is a U.S. national stage application of International Application No. PCT/JP2007/052720, filed Feb. 15, 2007, claiming a priority date of Feb. 24, 2006, and published in a non-English language.

TECHNICAL FIELD

This invention relates to a pressure regulating valve which is compact and can be controlled without consuming electric power and whose operating pressure can be easily controlled; a fuel cell system using the pressure regulating valve; and a hydrogen generating facility which decomposes a metal hydride to generate hydrogen.

BACKGROUND ART

As energy problems have attracted increasing attention in recent years, there has been a demand for a power source having a higher energy density and involving clean emissions. A fuel cell is a power generator having an energy density several times as high as that of the existing battery, and is characterized in that it has a high energy efficiency, and it is free from, or reduced in, nitrogen oxides or sulfur oxides contained in an emission gas. Thus, the fuel cell can be said to be a very effective device fulfilling requirements for a next-generation power source device.

With such a fuel cell, methanol or hydrogen is used as a fuel. To supply such a fuel continuously responsive to the consumption of the fuel, a pressure regulating valve is necessary. To achieve downsizing of the fuel cell, the pressure regulating valve needs to be downsized.

With the fuel cell which obtains an electromotive force by an electrochemical reaction between hydrogen and oxygen, hydrogen is required as a fuel. A known example of a facility for generating a hydrogen gas is a hydrogen generating facility of a structure which has a reaction vessel accommodating a metal hydride (boron hydride salt), and a water tank, and in which water within the water tank is supplied to the metal hydride in the reaction vessel by a pump (see, for example, Patent Document 1).

In such a hydrogen generating facility as well, a pressure regulating valve is required for supplying water into the reaction vessel in accordance with the consumption of hydrogen. Such a pressure regulating valve similarly needs to be downsized.

For the pressure regulating valve in a fuel cell system as mentioned above, a proposal has been made for a control mechanism which controls the amount of the fuel supplied from a fuel tank by utilizing a differential pressure between the pressure of a fuel electrode chamber and the pressure of an oxygen electrode chamber or outside air (see Patent Document 2).

The pressure regulating valve of this document, however, poses the problem that since a valve element acting in response to the differential pressure undergoes the pressure from the fuel tank, it fails to act normally unless the internal pressure of the fuel tank is constant. Such a document naturally targets the fuel cell using a hydrogen absorbing alloy, which presents a region where the hydrogen desorption pressure becomes constant. Thus, the above problem is supposed not to grow to a serious problem. On the other hand, the aforementioned hydrogen generating facility involving great changes in pressure, for example, suffers from the problem that the pressure regulating valve cannot be used.

In fields other than the above-mentioned fuel cell system and hydrogen generating facility, too, there is an intense demand for the advent of a pressure regulating valve which is compact and controllable without being supplied with electric power, and whose operating pressure can be set easily.

Patent Document 1: JP-A-2002-137903
Patent Document 2: JP-A-2004-31199

DISCLOSURE OF THE INVENTION

Summary of the Invention

The present invention has been accomplished in the light of the above-described situations. It is an object of the invention to provide a pressure regulating valve which is compact and can be controlled without consuming electric power and whose operating pressure can be easily controlled; and a fuel cell system and a hydrogen supply facility using the pressure regulating valve.

The pressure regulating valve of the present invention, for attaining the above object, is a pressure regulating valve, comprising: a first pressure deformation portion which receives a pressure on a fuel demand side and is deformable; a second pressure deformation portion which is provided to oppose the first pressure deformation portion, receives a predetermined pressure, and is deformable; a first flow passage, a second flow passage, and a communication passage for allowing the first and second flow passages to communicate with each other, the first flow passage, the second flow passage, and the communication passage being formed in a space between the first and, second pressure deformation portions; and a valve member having a connecting portion, which extends through the communication passage and connects the first pressure deformation portion and the second pressure deformation portion together, and having a valve element which is provided at the connecting portion and closes the communication passage when moved toward the second pressure deformation portion, and wherein when the pressure on the fuel demand side is lower than a predetermined value, the valve element does not close the communication passage, but when the pressure on the fuel demand side is equal to or higher than the predetermined value, the valve element closes the communication passage.

According to this feature, the valve member moves under the pressures exerted on the first and second pressure deformation portions to open and close the communication passage. Moreover, the flow passages for the fuel fluid, which are brought into or out of communication by the opening and closing of the communication passage, are provided between the first and second pressure deformation portions. Thus, downsizing is easy, and the opening and closing of the communication passage can be performed without major influence of the pressure from the supply source of the fuel fluid.

The pressure regulating valve of the present invention is characterized in that the first and second flow passages are provided on a side of the first pressure deformation portion and on a side of the second pressure deformation portion, respectively, with a partition member provided between the first pressure deformation portion and the second pressure deformation portion being interposed between the first and second flow passages, and the communication passage is provided to penetrate the partition member.

According to this feature, the first and second flow passages are provided between the first and second pressure deformation portions, with the partition member being interposed between the first and second flow passages. This, downsizing can be achieved easily.

The pressure regulating valve according to another feature of the present invention further comprises an isolation member for isolating the first pressure deformation portion and the fuel demand side from each other when the valve element moves toward the second pressure deformation portion to close the communication passage, and wherein when the valve element closes the communication passage, the, pressure from the fuel demand side to the first pressure deformation portion is cut off by the isolation member.

According to this feature, when the valve element closes the communication passage, the pressure from the fuel demand side to the first pressure deformation portion is cut off by the isolation member. Thus, when the communication passage is closed, the first pressure deformation portion is not affected by the pressure from the fuel demand side and, with the communication passage being closed, the first pressure deformation portion can be stabilized.

The fuel cell system according to a further feature of the present invention, for attaining the above object, is a fuel cell system comprising an anode chamber to be supplied with a fuel, and a pressure regulating valve, the pressure regulating valve including a first pressure deformation portion which receives a pressure on a fuel demand side and is deformable, a second pressure deformation portion which is provided to oppose the first pressure deformation portion, receives a predetermined pressure, and is deformable, a first flow passage, a second flow passage, and a communication passage for allowing the first and second flow passages to communicate with each other, the first flow passage, the second flow passage, and the communication passage being formed in a space between the first and second pressure deformation portions, and a valve member having a connecting portion, which extends through the communication passage and connects the first pressure deformation portion and the second pressure deformation portion together, and having a valve element which is provided at the connecting portion and closes the communication passage when moved toward the second pressure deformation portion, and wherein one of the first and second flow passages communicates with a fuel fluid supply source for supplying a fuel fluid comprising a fuel or a fuel generating material, and other of the first and second flow passages communicates with a flow passage communicating with the fuel demand side, and when the pressure on the fuel demand side is lower than a predetermined value, the valve element does not close the communication passage, and the fuel fluid comprising the fuel or the fuel generating material is supplied to the flow passage communicating with the fuel demand side, but when the pressure on the fuel demand side is equal to or higher than the predetermined value, the valve element closes the communication passage to stop a flow of the fuel fluid.

According to this feature, the valve member moves under the pressures exerted on the first and second pressure deformation portions to open and close the communication passage. Moreover, the flow passages for the fuel fluid, which are brought into or out of communication by the opening and closing of the communication passage, are provided between the first and second pressure deformation portions. Thus, downsizing is easy, the opening and closing of the communication passage can be performed without major influence of the pressure from the supply source of the fuel fluid, and the supply of the fuel fluid to the anode chamber can be performed stably.

The fuel cell system according to another feature of the present invention is characterized in that the first and second flow passages are provided on a side of the first pressure deformation portion and on a side of the second pressure deformation portion, respectively, with a partition member provided between the first pressure deformation portion and the second pressure deformation portion being interposed between the first and second flow passages, and the communication passage is provided to penetrate the partition member.

According to this feature, the first and second flow passages are provided between the first and second pressure deformation portions, with the partition member being sandwiched between the first and second flow passages. Thus, downsizing of the pressure regulating valve, accordingly, the fuel cell system, can be achieved easily.

The fuel cell system of the present invention may include an isolation member for isolating the first pressure deformation portion and the fuel demand side from each other when the valve element moves toward the second pressure deformation portion to close the communication passage, and wherein when the valve element closes the communication passage, the pressure from the fuel demand side to the first pressure deformation portion is cut off by the isolation member.

According to this feature, when the valve element closes the communication passage, the pressure from the fuel demand side to the first pressure deformation portion is cut off by the isolation member. Thus, when the communication passage is closed, the first pressure deformation portion is not affected by the pressure from the fuel demand side and, with the communication passage being closed, the first pressure deformation portion can be stabilized.

The fuel cell system according to a further feature of the present invention is characterized in that the fuel demand side is the anode chamber, and the fuel fluid is the fuel and comprises hydrogen or methanol.

According to this feature, the supply of hydrogen or methanol, which is the fuel, to the anode chamber can be performed stably via the pressure regulating valve.

The fuel cell system according to another feature of the present invention is characterized in that the fuel demand side is a reaction chamber for supplying the fuel to the anode chamber, and the fuel fluid is the fuel generating material, and comprises a reaction fluid which reacts with a hydrogen generating reactant accommodated in the reaction chamber to generate hydrogen.

According to this feature, the supply of the reaction fluid to the reaction chamber can be performed stably via the pressure regulating valve.

The fuel cell system in accordance with a further feature of the present invention is characterized in that the predetermined pressure exerted on the second pressure deformation portion is one of, or a combination of two or more of, atmospheric pressure, a pressure by a spring member, and a pressure from a pressurized fluid sealed up in a closed space.

According to this feature, the pressure exerted on the second pressure deformation portion is set at the predetermined pressure such as atmospheric pressure, a pressure by a spring member, or a pressure from a pressurized fluid. Thus, the operating pressure of the pressure regulating valve can be easily controlled.

The hydrogen generating facility according to one feature of the present invention comprises a reaction chamber accommodating a hydrogen generating reactant, and a pressure regulating valve, the pressure regulating valve including a first pressure deformation portion which receives a pressure with the reaction chamber and is deformable, a second pressure deformation portion which is provided to oppose the first pressure deformation portion, receives a predetermined pressure, and is deformable, a first flow passage, a second flow passage, and a communication passage for allowing the first and second flow passages to communicate with each other, the first flow passage, the second flow passage, and the communication passage being formed in a space between the first and second pressure deformation portions, and a valve member having a connecting portion, which extends through the communication passage and connects the first pressure deformation portion and the second pressure deformation portion together, and having a valve element which is provided at the connecting portion and closes the communication passage when moved toward the second pressure deformation portion, and wherein one of the first and second flow passages communicates with a supply source for supplying a reaction fluid, which reacts with the hydrogen generating reactant to generate hydrogen, to the reaction chamber, and other of the first and second flow passages communicates with a flow passage communicating with the reaction chamber, and when the pressure within the reaction chamber is lower than a predetermined value, the valve element does not close the communication passage, and the reaction fluid is supplied to the flow passage communicating with the reaction chamber, but when the pressure within the reaction chamber is equal to or higher than the predetermined value, the valve element closes the communication passage to stop a flow of the reaction fluid.

According to this feature, the valve member moves under the pressures exerted on the first and second pressure deformation portions to open and close the communication passage. Moreover, the flow passages for the fuel fluid, which are brought into or out of communication by the opening and closing of the communication passage, are provided between the first and second pressure deformation portions. Thus, downsizing is easy, and the opening and closing of the communication passage can be performed without major influence of the pressure from the supply source of the fuel fluid. Thus, the supply of the reaction fluid to the reaction chamber can be performed stably.

The hydrogen generating facility according to another feature of the present invention is characterized in that the first and second flow passages are provided on a side of the first pressure deformation portion and on a side of the second pressure deformation portion, respectively, with a partition member provided between the first pressure deformation portion and the second pressure deformation portion being interposed between the first and second flow passages, and the communication passage is provided to penetrate the partition member.

According to this feature, the first and second flow passages are provided between the first and second pressure deformation portions, with the partition member being sandwiched between the first and second flow passages. This, downsizing of the pressure regulating valve, accordingly, the hydrogen generating facility, can be achieved easily.

The hydrogen generating facility according to a further feature of the present invention further comprises an isolation member for isolating the first pressure deformation portion and an interior of the reaction chamber from each other when the valve element moves toward the second pressure deformation portion to close the communication passage, and wherein when the valve element closes the communication passage, the pressure from the interior of the reaction chamber to the first pressure deformation portion is cut off by the isolation member.

According to this feature, when the valve element closes the communication passage, the pressure from the reaction chamber to the first pressure deformation portion is cut off by the isolation member. Thus, when the communication passage is closed, the first pressure deformation portion is not affected by the pressure from within the reaction chamber and, with the communication passage being closed, the first pressure deformation portion can be stabilized.

The hydrogen generating facility in accordance with a further feature of the present invention is characterized in that the predetermined pressure exerted on the second pressure deformation portion is one of, or a combination of two or more of, atmospheric pressure, a pressure by a spring member, and a pressure from a pressurized fluid sealed up in a closed space.

According to this feature, the pressure exerted on the second pressure deformation portion is set at the predetermined pressure such as atmospheric pressure, a pressure by a spring member, or a pressure from a pressurized fluid. Thus, the operating pressure of the pressure regulating valve can be easily controlled.

EFFECTS OF THE INVENTION

The pressure generating valve of the present invention is compact, can be controlled without consuming electric power, and has an operating pressure easily controllable. The fuel cell system and hydrogen supply facility using the pressure regulating valve can be downsized, and show the effects that they can continuously supply the fuel fluid at a predetermined pressure without consuming electric power.

Figure 1:
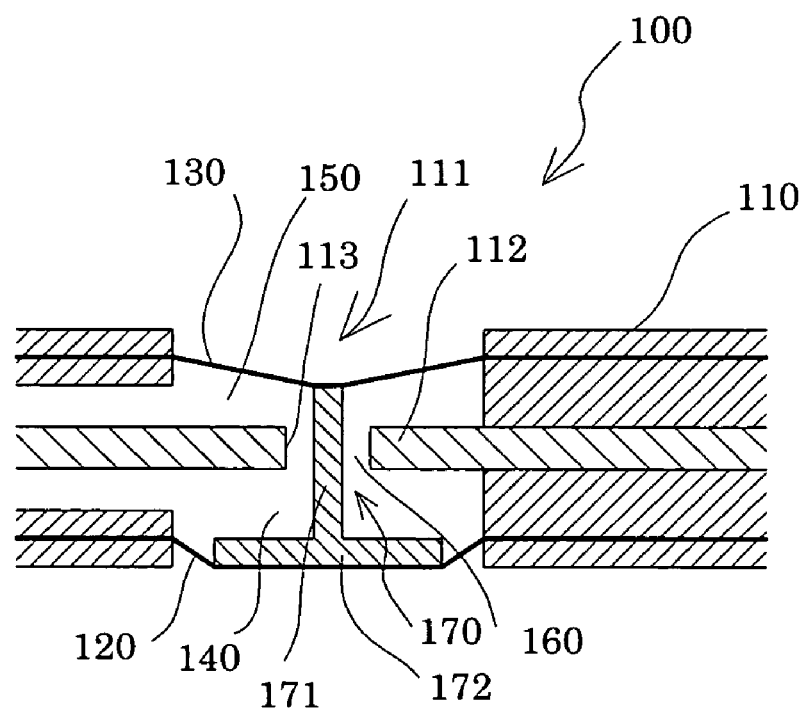
FIGS. 1(a) and 1(b) are schematic configurational drawings of a pressure regulating valve according to a first embodiment of the present invention.
Figure 1:
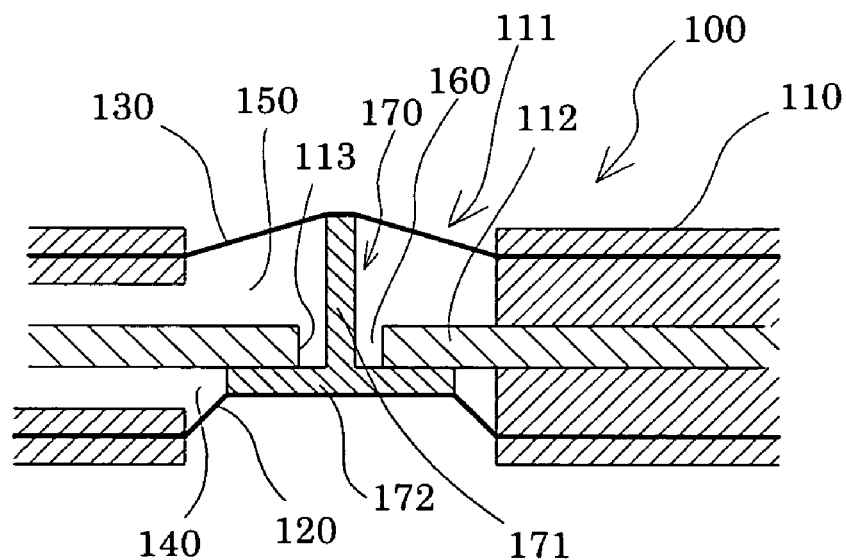

DETAILED DESCRIPTION OF THE INVENTION (First Embodiment)

FIGS. 1(a) and 1(b) are schematic configurational drawings of a pressure regulating valve according to a first embodiment of the present invention.

As shown in FIGS. 1(a) and 1(b), a pressure regulating valve 100 has a first pressure deformation portion 120 and a second pressure deformation portion 130 provided so as to close opposite sides, in the thickness direction of a base body 110, of a penetrating portion 111 provided in the base body 110, each of the first pressure deformation portion 120 and the second pressure deformation portion 130 comprising a flexible sheet and deformable in the thickness direction. The space of the penetrating portion 111 between the first and second pressure deformation portions 120 and 130 is partitioned by a partition member 112 provided in the middle of the base body 110 in its thickness direction. The part of the penetrating portion 111 beside the first pressure deformation portion 120 defines a first flow passage 140, while the part of the penetrating portion 111 beside the second pressure deformation portion 130 defines a second flow passage 150. Each of the first flow passage 140 and the second flow passage 150 extends in the plane direction of the base body 110, and the first flow passage 140 and the second flow passage 150 are brought into communication via a communication passage 160 comprising a through-hole 113 provided in the partition member 112.

In the space of the penetrating portion 111 between the first and second pressure deformation portions 120 and 130, there is provided a valve member 170 which moves upward and downward in the drawings, together with the first and second pressure deformation portions 120 and 130, in such a state as to be coupled to the first and second pressure deformation portions 120 and 130. The valve member 170 is furnished with a connecting portion 171 connecting the first and second pressure deformation portions 120 and 130 together and disposed to extend through the communication passage 160, and a valve element 172 provided on a side of the connecting portion 171 facing the first pressure deformation portion 120 to be capable of opening and closing the communication passage 160.

There is no limitation on the shape of the penetrating portion 111 provided in the base body 110. In consideration of the ease of deformation and the durability of the first and second pressure deformation portions 120 and 130, however, a cylindrical shape is preferred, and a cylindrical shape is imparted thereto in the present embodiment. Nor is any limitation imposed on the shape of the through-hole 113 provided in the partition member 112, and its sectional shape may be circular or rectangular. In the present embodiment, however, the through-hole 113 of a circular cross-sectional shape is adopted. Nor is there any limitation on the shapes of the connecting portion 171 and the valve element 172 of the valve member 170. In the present embodiment, the valve member 170 has a shape in which the valve element 172 of a disk shape is integrally provided at the connecting portion 171 in the form of a cylindrical rod.

Likewise, there are no limitations on the materials for the base body 110 and the partition member 112, and materials easy to downsize and durable to fluids contacting them may be used. However, in consideration of the ease of manufacture and from the aspect of cost, it is preferred to use various plastics. On the other hand, the materials for the first and second pressure deformation portions 120 and 130 are not limited, if they are deformable under pressure, do not allow contacting fluids to pass through them, and have durability. If the ease of manufacture and the aspect of cost are considered, however, it is possible to use various plastic sheets.

The connection between the first and second pressure deformation portions 120 and 130 and the valve member 170 may be performed by adhesion, thermal welding, or welding using ultrasonic waves or the like. In the illustrations, the valve member 170 is joined to the insides of the first and second pressure deformation portions 120 and 130. However, their connection may be, for example, such that the first pressure deformation portion 120 is joined to an outer edge portion of the valve element 172. Furthermore, the connecting portion 171 is present in a penetrating state in the communication passage 160. It goes without saying, therefore, that the dimensions of the through-hole 113 and the connecting portion 171 need to be designed in consideration of passage resistance occurring when the first flow passage 140 and the second flow passage 150 are brought into communication.

The actions of the pressure regulating valve 100 of the above configuration will be described below.

The pressure regulating valve 100 is so disposed as to receive the pressure from the fuel demand side by the outside of the first pressure deformation portion 120, and receive a predetermined pressure, such as atmospheric pressure, by the outside of the second pressure deformation portion 130. The pressure regulating valve 100 is also used such that one of the first and second flow passages 140 and 150 is connected to a flow passage communicating with a supply source of a fuel or a fuel generating material, and the other of them is connected to a flow passage to the fuel demand side which is an object to be supplied with the fuel.

If, in such a state of usage, the pressure on the fuel demand side exerted on the first pressure deformation portion 120 is higher than the atmospheric pressure exerted on the second pressure deformation portion 130, the first and second pressure deformation portions 120 and 130 move upward in the drawing, together with the valve member 170, as shown in FIG. 1(*b*). This brings the valve element 172 into contact with the partition member 112 to close the communication passage 160, namely, cut off the communication between the first flow passage 140 and the second flow passage 150.

If the pressure on the fuel demand side exerted on the first pressure deformation portion 120 becomes lower than the atmospheric pressure exerted on the second pressure deformation portion 130, on the other hand, the first and second pressure deformation portions 120 and 130 move downward in the drawing, together with the valve member 170, as shown in FIG. 1(*a*). This renders the valve element 172 separated from the partition member 112 to open the communication passage 160, namely, establish the communication between the first flow passage 140 and the second flow passage 150. As a result, the fuel or the fuel generating material is supplied to the fuel demand side, which is the object of fuel supply, from the supply source of the fuel or fuel generating material connected to one of the first and second flow passages 140 and 150. When the pressure on the fuel demand side becomes higher than the atmospheric pressure because of this supply, the above-mentioned closed state is produced. In order that the fuel or the fuel generating material is supplied when the communication passage 160 comes to an open state, it is only natural that the pressure on the supply source side needs to be higher than the pressure on the object of supply side.

As described above, the pressure regulating valve 100 can exercise opening and closing control in accordance with the state of the pressure on the fuel demand side applied to the first pressure deformation portion 120, namely, without consumption of electric power. The operating pressure for switching between opening and closing is nearly the pressure exerted on the second pressure deformation portion 130, the atmospheric pressure in this case. The reason why the operating pressure is set at nearly the atmospheric pressure is as follows: Circumstances differ according to which of the first and second flow passages 140 and 150 the supply source of fuel or the like is connected to. When the supply source is connected to the second flow passage 150, for example, the closed state of FIG. 1(*b*) results in the application of the pressure from the supply source to the inside of the valve element 172 existent within the communication passage 160. This pressure has been confirmed to exert minimal influence on the opening and closing action or motion, partly because the area subjected to the pressure is small. Actually, however, the pressure regulating valve 100 needs to be designed, with the influence of such a pressure being taken into consideration. Needless to say, moreover, the actual operating pressure differs according to the areas of the first and second pressure deformation portions 120 and 130. Anyway, if the operating pressure is set by designing, the action is initiated according to a pressure change, without consumption of electric power.

The pressure regulating valve 100 of the present embodiment also has the advantage of downsizing, because the first and second flow passages 140 and 150 are provided in the space between the first and second pressure deformation portions 120 and 130. The arrangement of the first and second flow passages 140 and 150 is such that in the present embodiment, these flow passages are provided on both sides of the partition member 112. However, both of the first and second flow passages 140 and 150 can be disposed on one side of the partition member, rightwardly of and leftwardly of the valve member 170 in the drawings, and brought into communication via the communication passage 160.

(Second Embodiment)

Figure 2:
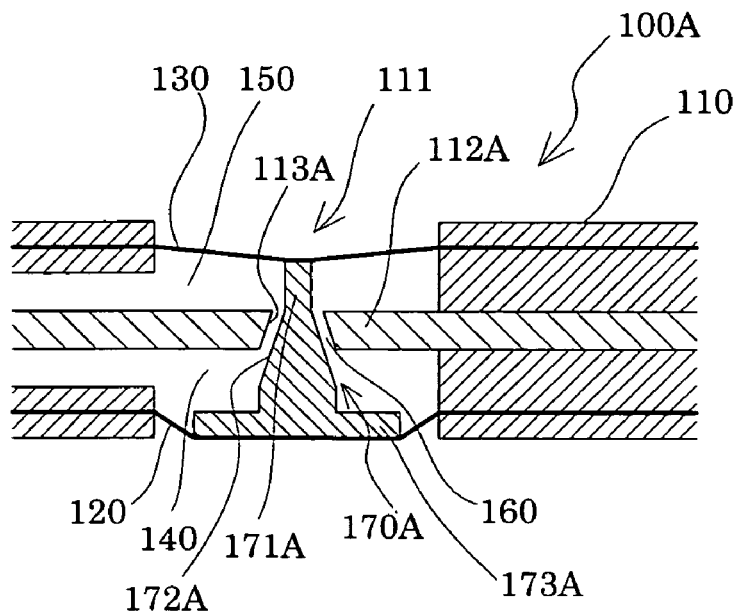
FIGS. 2(a) and 2(b) are schematic configurational drawings of a pressure regulating valve according to a second embodiment of the present invention.
Figure 2:
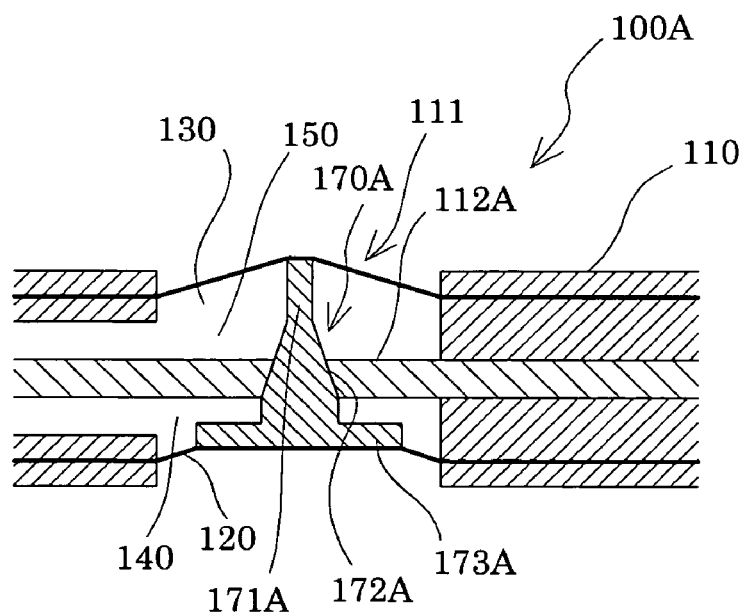

FIGS. 2(a) and 2(b) show the schematic configuration of a pressure regulating valve according to a second embodiment of the present invention. The same members as those in the first embodiment, or members showing the same actions as those in the first embodiment are assigned the same numerals as in the first embodiment, and duplicate explanations are omitted.

As shown in FIGS. 2(a) and 2(b), a pressure regulating valve 100A has the same basic configuration as that in the first embodiment, except that the shape of a valve member 170A and the shape of a through-hole 113A of a partition member 112A are different from those in the first embodiment.

The valve member 170A has a valve element 172A of a conical shape provided halfway through a connecting portion 171A, and closes the communication passage 160 with a taper part of the valve element 172A. Thus, a disk portion 173A at the lower end in the drawings need not be necessarily provided, but has the advantage of imparting satisfactory durability, because the area of its connection to the first pressure deformation portion 120 is increased. Hence, such a disk portion 173A may be provided at the junction of the upper end of the connecting portion 171A with the second pressure deformation portion 130.

The through-hole 113A in the shape of a taper, which is fitted with the taper-shaped valve element 172A, is provided in the partition member 112A. This makes the area of contact between the valve element 172A and the through-hole 113A so large that the closed state of the communication passage 160 can be stabilized. Needless to say, however, a through-hole in a straight state as in the first embodiment may be adopted.

The way of using, and the actions of, the pressure regulating valve 100A as described above are the same as those in the aforementioned first embodiment. Thus, their explanations will be omitted.

(Third Embodiment)

Figure 3:
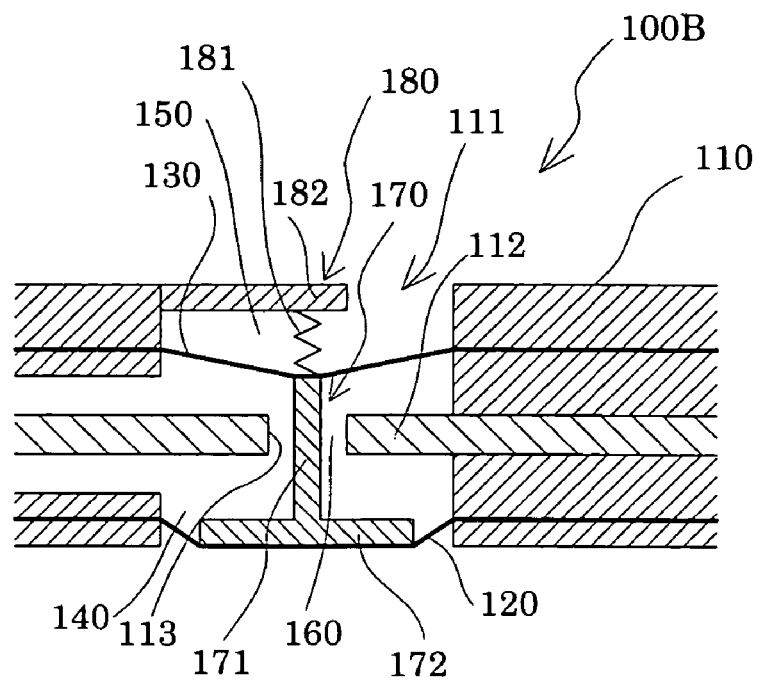
FIG. 3 is a schematic configurational drawing of a pressure regulating valve according to a third embodiment of the present invention.

FIG. 3 shows the schematic configuration of a pressure regulating valve according to a third embodiment of the present invention. The same members as those in the first embodiment, or members showing the same actions as those in the first embodiment are assigned the same numerals as in the first embodiment, and duplicate explanations are omitted.

As shown in FIG. 3, a pressure regulating valve 100B has the same basic configuration as that in the first embodiment, except that not only atmospheric pressure, but also pressure from a spring member 181 of a pressure applying means 180 is exerted on the second pressure deformation portion 130. The spring member 181 of the pressure applying means 180 is interposed between a support portion 182, which is provided to protrude from the base body 110 into the penetrating portion 111, and a region of the second pressure deformation portion 130 opposing the connecting portion 171. The spring member 181 may be one which has a spring force for urging the valve member 170 always in the opening direction, or one which has a spring force for pulling the valve member 170 always in the closing direction.

By providing the pressure applying means 180 as noted above, the operating pressure can be changed from atmospheric pressure. If the spring member 181 has a spring force for urging the valve member 170 in the opening direction, for example, the spring force from the spring member is always exerted on the second pressure deformation portion 130, so that the open state is kept until a state at a higher pressure than atmospheric pressure. That is, the operation can be performed such that the pressure on the fuel demand side is held at a pressure higher than atmospheric pressure.

If the spring member 181 has a spring force for pulling the valve member 170 in the closing direction, on the other hand, the operation is performed at a pressure lower than atmospheric pressure.

(Fourth Embodiment)

Figure 4:
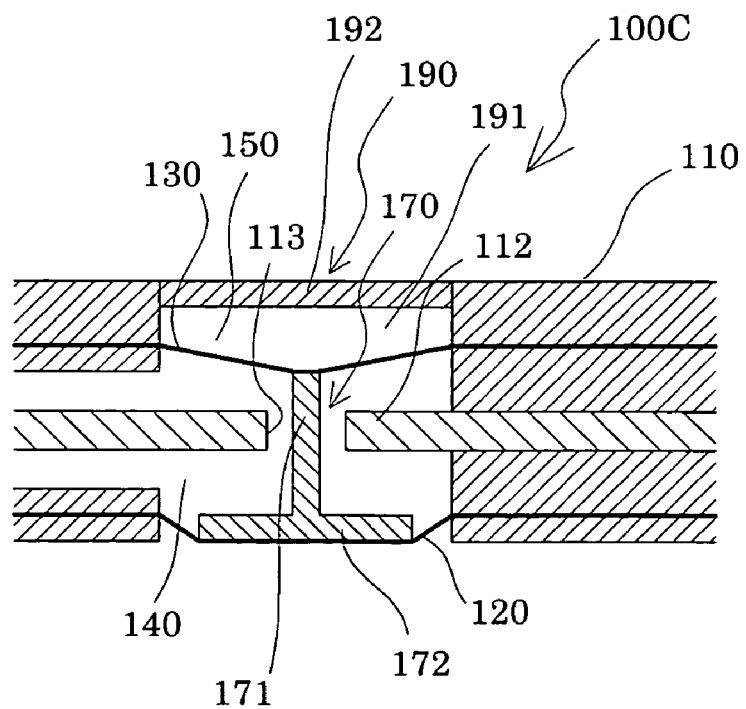
FIG. 4 is a schematic configurational drawing of a pressure regulating valve according to a fourth embodiment of the present invention.

FIG. 4 shows the schematic configuration of a pressure regulating valve according to a fourth embodiment of the present invention. The same members as those in the first embodiment, or members showing the same actions as those in the first embodiment are assigned the same numerals as in the first embodiment, and duplicate explanations are omitted.

As shown in FIG. 4, a pressure regulating valve 100C has the same basic configuration as that in the first embodiment, except that the pressure of a gas within a pressurization chamber 191 of a pressure setting means 190 is exerted on the second pressure deformation portion 130. The pressurization chamber 191 of the pressure setting means 190 is provided between a wall member 192 and the second pressure deformation portion 130, and a pressurized gas such as compressed air is sealed up in the pressurization chamber 191.

By so providing the pressure setting means 190 to set the pressure within the pressurization chamber 191 as appropriate, the operating pressure can be set, for example, at a pressure higher than atmospheric pressure. That is, since the pressure within the pressurization chamber 191 is always exerted on the second pressure deformation portion 130, the closed state is produced when the fuel demand side reaches a pressure higher than this pressure. In other words, the pressure within the pressurization chamber 191 is rendered higher than atmospheric pressure, whereby the pressure regulating valve 100C can be operated such that the pressure on the fuel demand side is held at this pressure.

If the pressure within the pressurization chamber 191 is set in the state of reduced pressure lower than atmospheric pressure, it is needless to say that the pressure regulating valve 100C operates at a lower pressure than atmospheric pressure.

(Fifth Embodiment)

Figure 5:
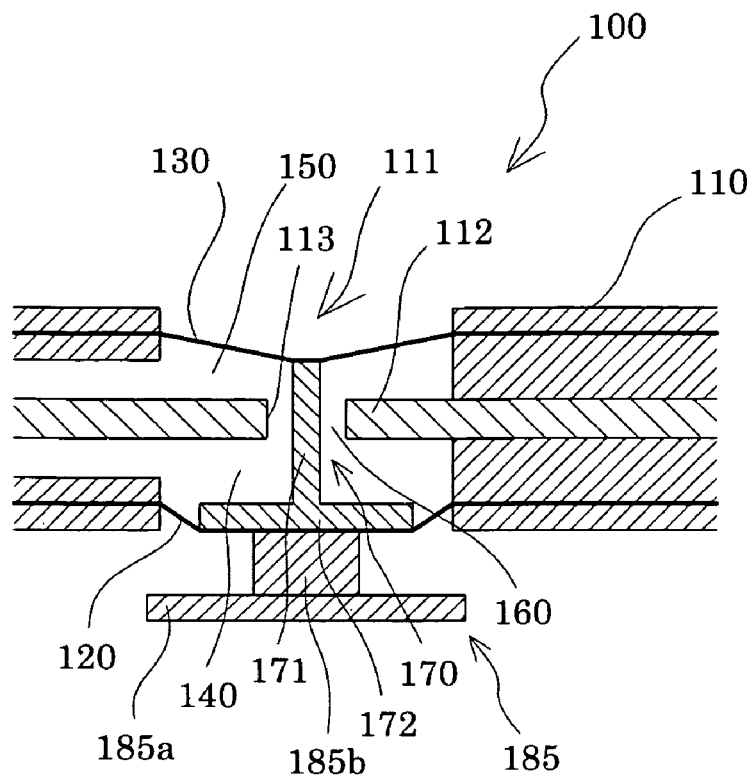
FIGS. 5(a) and 5(b) are schematic configurational drawings of a pressure regulating valve according to a fifth embodiment of the present invention.
Figure 5:
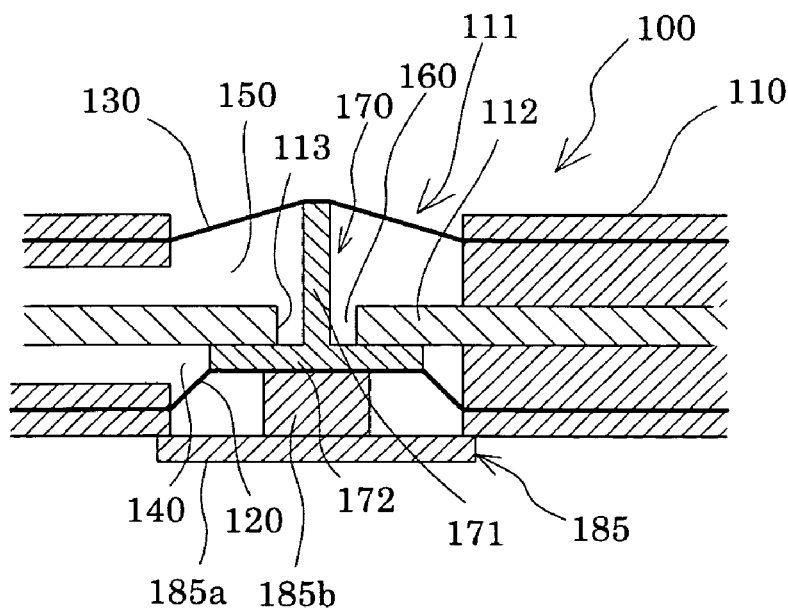

FIGS. 5(a) and 5(b) show the schematic configuration of a pressure regulating valve according to a fifth embodiment of the present invention. The same members as those in the first embodiment, or members showing the same actions as those in the first embodiment are assigned the same numerals as in the first embodiment, and duplicate explanations are omitted.

As shown in FIGS. 5(a) and 5(b), the pressure regulating valve 100 has an isolation member 185 provided below the valve element 172, with the first pressure deformation portion 120 being interposed between the valve element 172 and the isolation member 185. The other features are the same as those in the first embodiment.

The isolation member 185 is composed of a base portion 185b mounted on a lower side surface of the valve element 172, and a plate-shaped covering portion 185a provided to be continuous with the base portion 185b. The vertical length of the base portion 185b is set such that when the valve element 172 moves upward in the drawing to close the communication passage 160, the covering portion 185a abuts on the peripheral edge of the penetrating portion 111 of the base body 110. The size of the covering portion 185a is set to be larger than the peripheral edge of the penetrating portion 111. The isolation member 185 (the base portion 185b and the covering portion 185a) is formed from an elastic member such as rubber.

When the pressure on the fuel demand side exerted on the first pressure deformation portion 120 is higher than atmospheric pressure applied to the second pressure deformation portion 130, the valve member 170 moves upward in the drawings, together with the first and second pressure deformation portions 120 and 130, whereupon the valve element 172 closes the communication passage 160. At this time, the covering portion 185a of the isolation member 185 abuts on the peripheral edge of the penetrating portion 111. As a result, when the communication passage 160 is closed, the first pressure deformation portion 120 is covered with the covering portion 185a of the isolation member 185, with the result that the pressure on the fuel demand side does not act on the first pressure deformation portion 120. Thus, the influence of the pressure on the fuel demand side after closure of the valve element 172 can be eliminated.

It is also possible to set the vertical length of the base portion 185b to be somewhat short, thereby warping the covering portion 185a when the covering portion 185a abuts on the peripheral edge of the penetrating portion 111 of the base body 110. By so doing, even if variations occur in the vertical length of the base portion 185b, the abutment of the covering portion 185a upon the peripheral edge of the penetrating portion 111 can be performed reliably.

(Sixth Embodiment)

Figure 6:
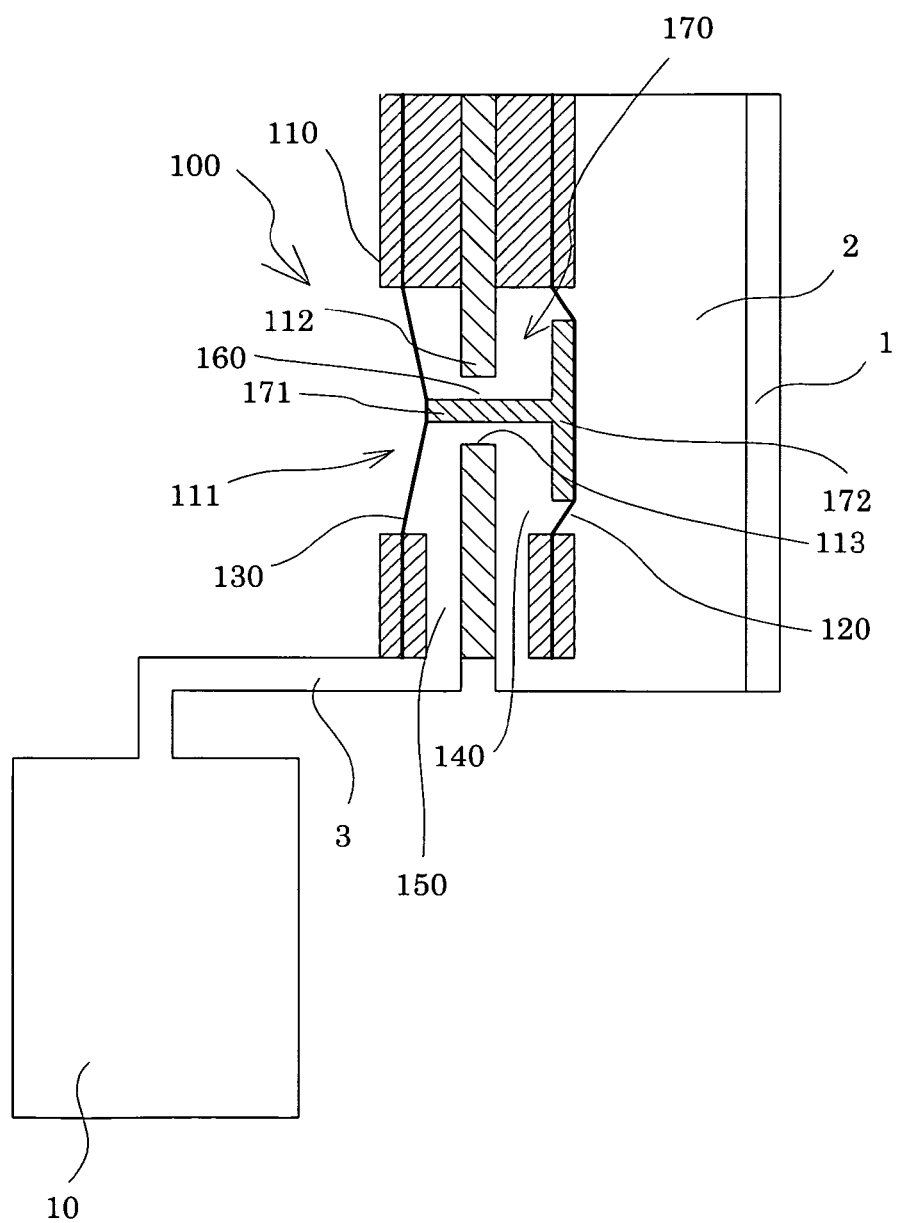
FIG. 6 is a configurational drawing showing an example of a fuel cell system to which the pressure regulating valve of the present invention is applied.

FIG. 6 shows the configuration of an example of a fuel cell system to which the pressure regulating valve of the present invention described above is applied. This embodiment has the pressure regulating valve 100 of FIGS. 1(*a*) and 1(*b*) applied to a polymer electrolyte fuel cell using hydrogen as a fuel.

This fuel cell system is equipped with a power generating portion 1 of the polymer electrolyte fuel cell for electrochemically reacting hydrogen and oxygen to cause power generation, a negative electrode chamber (anode chamber) 2 for temporarily storing hydrogen to be supplied to the power generating portion 1, and a hydrogen storage portion 10 comprising a hydrogen absorbing alloy or a hydrogen gas cylinder and adapted to supply hydrogen to the negative electrode chamber 2, and has the pressure regulating valve 100 provided halfway through a hydrogen conduit 3 between the negative electrode chamber 2 and the hydrogen storage portion 10.

The pressure regulating valve 100, as mentioned above, has the first pressure deformation portion 120 and the second pressure deformation portion 130 provided so as to close opposite sides, in the thickness direction of the base body 110, of the penetrating portion 111 provided in the base body 110, each of the first pressure deformation portion 120 and the second pressure deformation portion 130 comprising a flexible sheet. The space of the penetrating portion 111 between the first and second pressure deformation portions 120 and 130 is partitioned by the partition member 112 provided in the middle of the base body 110 in its thickness direction. The part of the penetrating portion 111 beside the first pressure deformation portion 120 defines the first flow passage 140, while the part of the penetrating portion 111 beside the second pressure deformation portion 130 defines the second flow passage 150. Each of the first flow passage 140 and the second flow passage 150 extends in the plane direction of the base body 110, and the first flow passage 140 and the second flow passage 150 are brought into communication via the communication passage 160 comprising the through-hole 113 provided in the partition member 112. In the space of the penetrating portion 111 between the first and second pressure deformation portions 120 and 130, there is provided the valve member 170 which moves rightward and leftward in the drawing, together with the first and second pressure deformation portions 120 and 130, in such a state as to be coupled to the first and second pressure deformation portions 120 and 130. The valve member 170 is furnished with the connecting portion 171 connecting the first and second pressure deformation portions 120 and 130 together and disposed to extend through the communication passage 160, and the valve element 172 provided on the side of the connecting portion 171 facing the first pressure deformation portion 120 to be capable of opening and closing the communication passage 160.

In the present embodiment, the pressure regulating valve 100 is so disposed as to receive the pressure on the fuel demand side, namely, the pressure within the negative electrode chamber 2, by the outside of the first pressure deformation portion 120, and receive a predetermined pressure, which is atmospheric pressure, by the outside of the second pressure deformation portion 130. The pressure regulating valve 100 is used such that the first flow passage 140 communicates with the negative electrode chamber 2, and the second flow passage 150 is connected to the hydrogen conduit 3 which is a flow passage in communication with the hydrogen storage portion 10.

According to the above-described configuration, the pressure regulating valve 100 receives the pressure within the negative electrode chamber 2 by the outside of the first pressure deformation portion 120, and receives atmospheric pressure by the outside of the second pressure deformation portion 130. Therefore, if the pressure within the negative electrode chamber 2 exerted on the first pressure deformation portion 120 is higher than the atmospheric pressure exerted on the second pressure deformation portion 130, the first and second pressure deformation portions 120 and 130 move upward as shown in FIG. 1(*b*) (leftward in FIG. 6), together with the valve member 170. This brings the valve element 172 into contact with the partition member 112 to close the communication passage 160, namely, interrupt the communication between the first flow passage 140 and the second flow passage 150. As a result, the supply of hydrogen from the hydrogen storage portion 10 to the negative electrode chamber 2 is cut off.

If, on the other hand, the power generating portion 1 is connected to a load, electric power is consumed, resulting in the consumption of hydrogen and leading to a drop in the pressure within the negative electrode chamber 2 exerted on the first pressure deformation portion 120. When this pressure becomes lower than the atmospheric pressure exerted on the second pressure deformation portion 130, the first and second pressure deformation portions 120 and 130 move downward as shown in FIG. 1(*a*) (rightward in FIG. 6), together with the valve member 170. This renders the valve element 172 separated from the partition member 112 to open the communication passage 160, namely, establish the communication between the first flow passage 140 and the second flow passage 150. As a result, hydrogen is supplied from the hydrogen storage portion 10 to the negative electrode chamber 2. When the pressure within the negative electrode chamber 2 becomes higher than the atmospheric pressure owing to this supply of hydrogen, the above-mentioned closed state is produced.

As described above, the pressure regulating valve 100 operates to be capable of exercising opening and closing control over the hydrogen conduit 3, which is the supply passage for hydrogen, without consumption of electric power, in accordance with the state of the pressure within the negative electrode chamber 2 exerted on the first pressure deformation portion 120, so that hydrogen can be supplied as power is generated by the power generating portion 1. The operating pressure for switching between opening and closing is nearly the pressure exerted on the second pressure deformation portion 130 and, in this case, the atmospheric pressure.

It goes without saying that the pressure regulating valve of any of the aforementioned other embodiments can be adopted instead of the pressure regulating valve 100.

(Seventh Embodiment)

Figure 7:
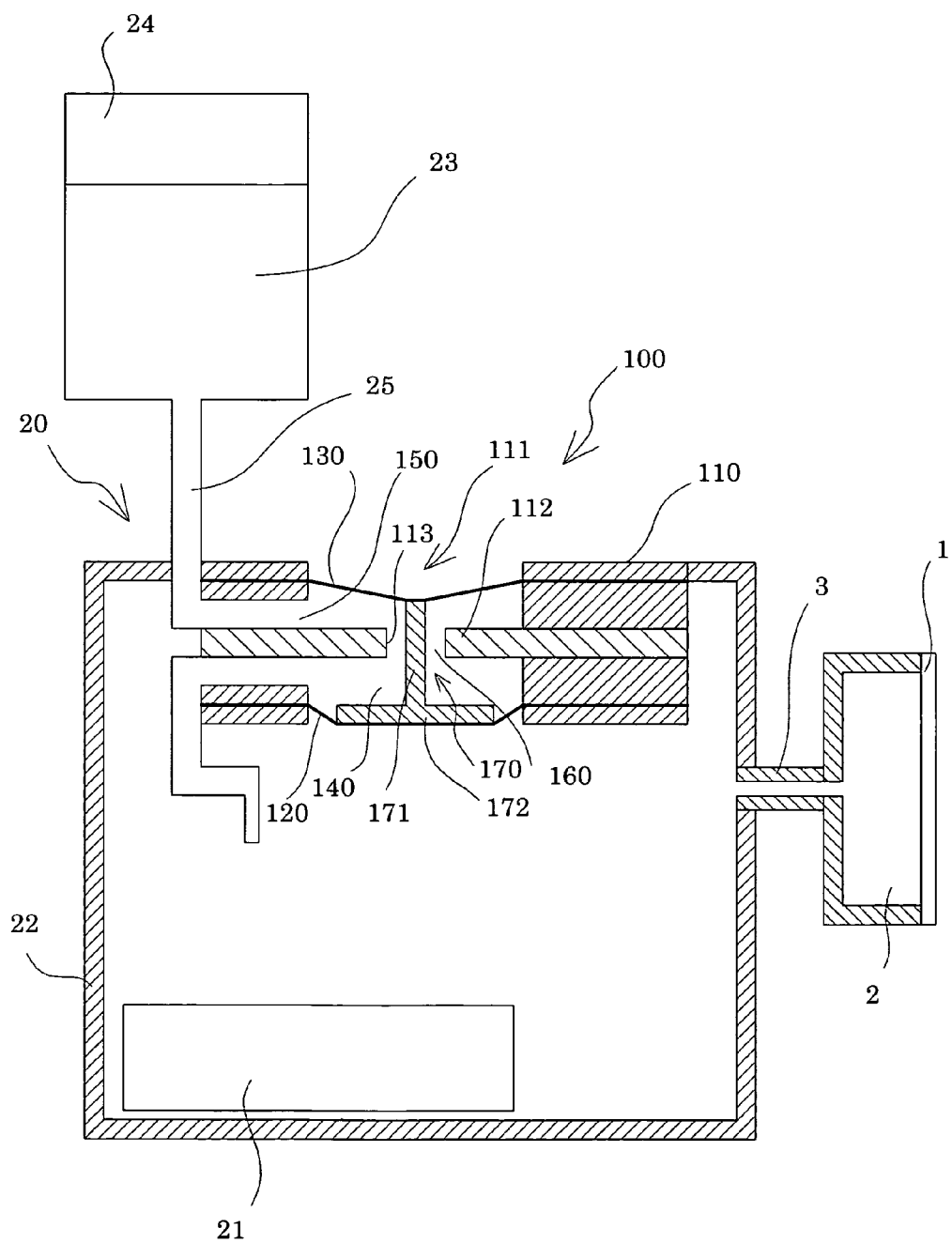
FIG. 7 is a configurational drawing showing an example of a fuel cell system to which the pressure regulating valve of the present invention is applied.

FIG. 7 shows the configuration of an example of a fuel cell system to which the pressure regulating valve of the present invention described above is applied. This embodiment has the pressure regulating valve 100 of FIGS. 1(a) and 1(b) applied to a polymer electrolyte fuel cell using hydrogen as a fuel.

This fuel cell system adopts a hydrogen generating facility 20 as a hydrogen supply section. The hydrogen generating facility 20 is equipped with a reaction portion (reaction chamber) 22, which is a site accommodating a hydrogen reaction substance 21 and adapted to generate hydrogen, and a liquid storage portion 24 for storing a hydrogen generating aqueous solution 23, and has the pressure regulating valve 100 provided halfway through a supply passage 25 for supplying the hydrogen generating aqueous solution 23 from the liquid storage portion 24 to the reaction portion 22. In this fuel cell system, the reaction portion 22 and a negative electrode chamber 2 annexed to a power generating portion 1 are connected together by a hydrogen conduit 3.

The above hydrogen generating facility 20 reacts the hydrogen generating aqueous solution 23 and the hydrogen reaction substance 21 to generate necessary hydrogen, and supplies it. The pressure regulating valve 100 has the same configuration as that of the first embodiment. Thus, the same members as those in the first embodiment are assigned the same numerals as in the first embodiment, and duplicate explanations are omitted.

Examples of a combination of the hydrogen generating aqueous solution 23 and the hydrogen reaction substance 21 are those which use water, or an aqueous solution containing an additive added to water, as the hydrogen generating aqueous solution 23, and use a metal hydride for generating hydrogen upon hydrolysis, or a mixture of this metal hydride and an additive, as the hydrogen reaction substance 21. Examples of the metal hydride are compounds of alkali metals, alkaline earth metals, and complex metals with hydrogen, such as sodium hydride, sodium boron hydride, sodium aluminum hydride, lithium aluminum hydride, lithium boron hydride, lithium hydride, calcium hydride, aluminum hydride, and magnesium hydride. Examples of the additive mixed with the metal hydride are solid organic acids or their salts, metal chlorides, and metals consisting of platinum, gold, copper, nickel, iron, titanium, zirconium, and ruthenium, and their alloys. Advisably, at least one additive selected from them is used. The use of such an additive results in the incorporation of an accelerator or a catalyst for a hydrogen generating reaction into the metal hydride, thus making the rate of the reaction extremely fast. Consequently, when water is supplied to the metal hydride, the internal pressure of the reaction portion can be raised immediately.

As the hydrogen generating aqueous solution 23, it is preferred to use water itself, or an aqueous solution containing an organic acid or its salt, an inorganic acid or its salt, or a metal chloride, mixed with water. By this use, an aqueous solution as an accelerator for accelerating the hydrogen generating reaction can be obtained. Thus, the reaction rate becomes so fast that when the hydrogen generating reaction occurs, the internal pressure of the reaction portion can be raised immediately. Such substances added to water are not limited, but organic acids or their salts, inorganic acids or their salts, and metal chlorides can be named. For example, sulfuric acid, malic acid, citric acid, and succinic acid can be named as the acids, and cobalt chloride, iron chloride, nickel chloride, and chlorides of platinum group metals can be named as the metal chlorides.

As further combinations of the hydrogen generating aqueous solution 23 and the hydrogen reaction substance 21, there can be named those comprising the hydrogen generating aqueous solution 23 which is an aqueous solution of an acid or a base, and the hydrogen reaction substance 21 which is a metal. Here, it is preferred to use hydrochloric acid, sulfuric acid or the like as the acid, and use a base metal as the metal applied to any of these acids. As the aqueous solution of the base, an aqueous solution of sodium hydroxide or an aqueous solution of potassium hydroxide can be named. The metal applied to such an aqueous solution of the base is an amphoteric metal. By mixing them, hydrogen can be obtained at a fast rate.

In the present embodiment, the pressure regulating valve 100 is so disposed as to receive the pressure on the fuel demand side, namely, the pressure within the reaction portion 22, by the outside of the first pressure deformation portion 120, and receive a predetermined pressure, which is atmospheric pressure, by the outside of the second pressure deformation portion 130. The pressure regulating valve 100 is used such that the first flow passage 140 communicates with the reaction portion 22, and the second flow passage 150 is connected to the supply passage 25 which is a flow passage in communication with the liquid storage portion 24.

According to the above-described configuration, the pressure regulating valve 100 receives the pressure within the reaction portion 22, which communicates with the negative electrode chamber 2, by the outside of the first pressure deformation portion 120, and receives atmospheric pressure by the outside of the second pressure deformation portion 130. Therefore, if the pressure within the reaction portion 22 exerted on the first pressure deformation portion 120 is higher than the atmospheric pressure exerted on the second pressure deformation portion 130, the first and second pressure deformation portions 120 and 130 move upward in the drawing, as shown in FIG. 1(b), together with the valve member 170. This brings the valve element 172 into contact with the partition member 112 to close the communication passage 160, namely, interrupt the communication between the first flow passage 140 and the second flow passage 150. As a result, the supply of the hydrogen generating aqueous solution 23 from the liquid storage portion 24 to the reaction portion 22 is cut off.

If, on the other hand, the power generating portion 1 is connected to a load, electric power is consumed, resulting in the consumption of hydrogen and leading to a drop in the pressure within the reaction portion 22 exerted on the first pressure deformation portion 120. When this pressure becomes lower than the atmospheric pressure exerted on the second pressure deformation portion 130, the first and second pressure deformation portions 120 and 130 move downward in the drawing, as shown in FIG. 1(a), together with the valve member 170. This renders the valve element 172 separated from the partition member 112 to open the communication passage 160, namely, establish the communication between the first flow passage 140 and the second flow passage 150. As a result, the hydrogen generating aqueous solution 23 is supplied from the liquid storage portion 24 to the reaction portion 22 to generate hydrogen, and this hydrogen is supplied to the negative electrode chamber 2. When the pressure within the reaction portion 22 becomes higher than atmospheric pressure owing to this generation of hydrogen, the above-mentioned closed state is produced.

As described above, the pressure regulating valve 100 operates to be capable of exercising opening and closing control over the supply passage 25 for the hydrogen generating aqueous solution 23, without consumption of electric power, in accordance with the state of the pressure within the reaction portion 22 exerted on the first pressure deformation portion 120, so that hydrogen can be supplied as power is generated by the power generating portion 1. The operating pressure for switching between opening and closing is nearly the pressure exerted on the second pressure deformation portion 130 and, in this case, atmospheric pressure.

It goes without saying that the pressure regulating valve of any of the aforementioned other embodiments can be adopted instead of the pressure regulating valve 100.

(Eighth Embodiment)

Figure 8:
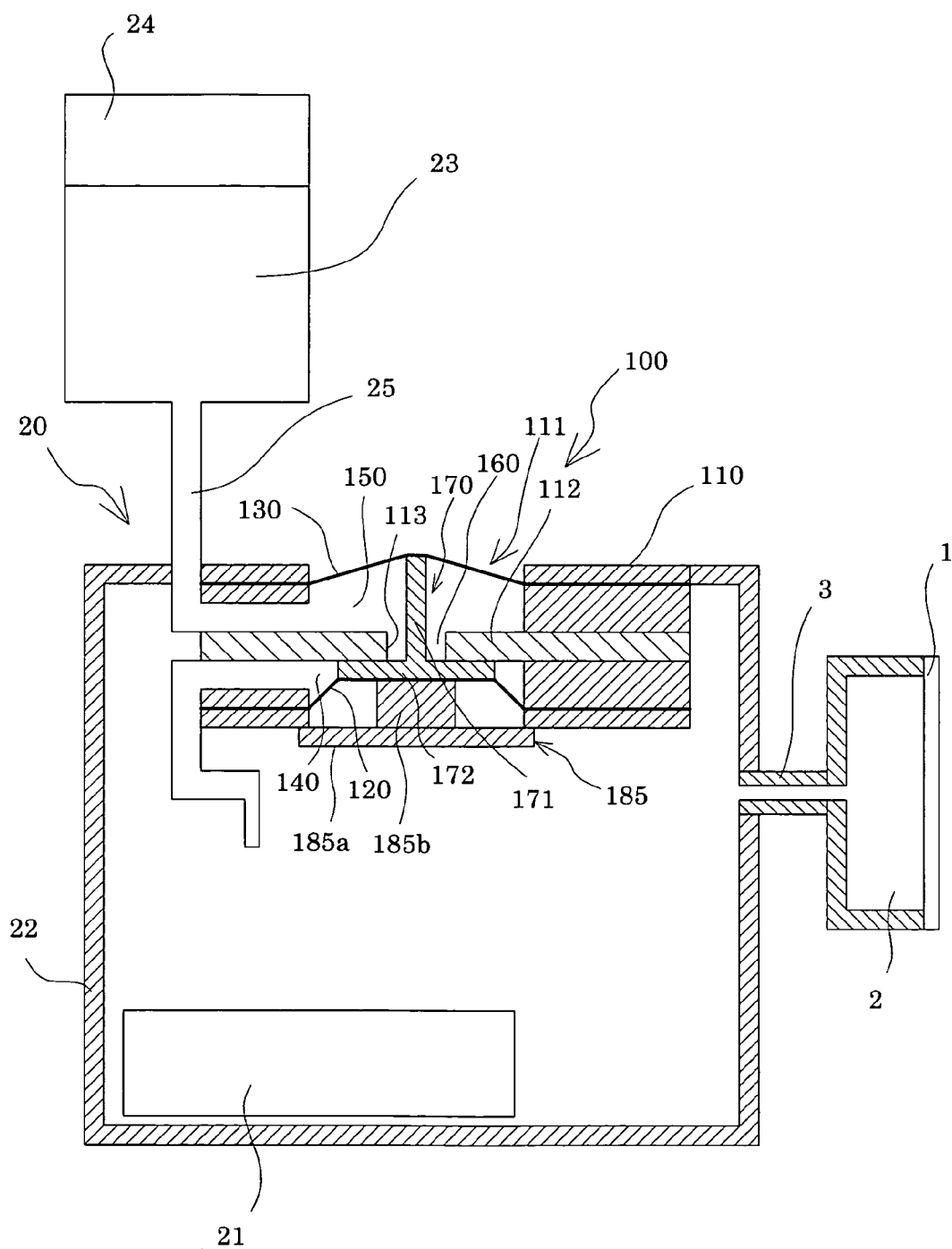
FIG. 8 is a configurational drawing showing an example of a fuel cell system to which the pressure regulating valve of the present invention is applied.
Figure 9:
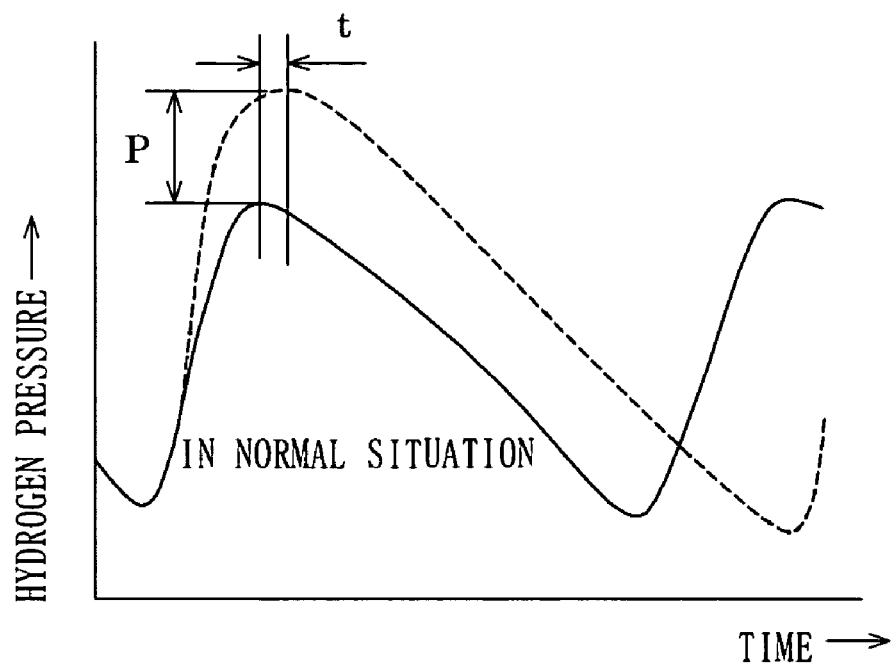
FIG. 9 is a graph showing changes over time in the hydrogen pressure of the fuel cell system to which the pressure regulating valve of the present invention is applied.

FIG. 8 shows the configuration of an example of a fuel cell system to which the pressure regulating valve of the present invention described above is applied. This embodiment is an embodiment in which the pressure regulating valve 100 of FIGS. 5(a), 5(b) is applied to the system of FIG. 7. FIG. 9 shows a graph showing changes over time in hydrogen pressure.

When the pressure within the reaction portion 22 exerted on the first pressure deformation portion 120 is higher than atmospheric pressure applied to the second pressure deformation portion 130, the first and second pressure deformation portions 120 and 130 move upward in the drawing, together with the valve member 170. Thus, the valve element 172 abuts on the partition member 112, causing a state in which the communication passage 160 is closed, namely, a state in which the communication between the first flow passage 140 and the second flow passage 150 is interrupted. As a result, the supply of the hydrogen generating aqueous solution 23 from the liquid storage portion 24 to the reaction portion 22 is cut off.

At this time, the covering portion 185a of the isolation member 185 abuts on the peripheral edge of the penetrating portion 111. When the communication passage 160 is closed, the first pressure deformation portion 120 is covered with the covering portion 185a of the isolation member 185, with the result that the pressure on the fuel demand side does not act on the first pressure deformation portion 120. Thus, the influence of the pressure on the fuel demand side after closure of the valve element 172 can be eliminated. Even if the internal pressure of the reaction portion 22 changes (rises) after the valve element 172 is closed, the influence of the internal pressure of the reaction portion 22 is not exerted on the first pressure deformation portion 120.

The first pressure deformation portion 120 is formed of an elastic body. Thus, if pressure is applied to the first pressure deformation portion 120 after closure of the valve element 172, warpage is expected to occur in the first pressure deformation portion 120. When warpage occurs in the first pressure deformation portion 120 after closure of the valve element 172, the hydrogen generating aqueous solution 23 remaining within the piping path may be pushed out to cause a further reaction with the hydrogen reaction substance 21, presenting an excess reaction. That is, the hydrogen pressure is likely to reach a higher pressure than in the normal situation (pressure increase P), as indicated by a dashed line in FIG. 9.

Moreover, a period of time until the interior of the piping path is filled with the hydrogen generating aqueous solution 23 may be needed for next solution feeding. Thus, the time until actual solution feeding may lengthen, resulting in poor responsiveness. That is, the higher hydrogen pressure than in the normal situation delays the time to peak by time t, as indicated by the dashed line in FIG. 9.

In the above-described embodiment, the pressure on the fuel demand side does not act on the first pressure deformation portion 120 after closure of the valve element 172. Thus, warpage does not occur in the first pressure deformation portion 120, and the excess reaction can be prevented. Nor is the hydrogen generating aqueous solution 23 within the piping path pushed out, so that the time until next solution feeding does not lengthen. Furthermore, warpage of the first pressure deformation portion 120 can be suppressed, and thus deterioration more than necessarily involved can be prevented.

INDUSTRIAL APPLICABILITY

The present invention can be utilized, for example, in the industrial fields of hydrogen generating facilities which decompose metal hydrides to generate hydrogen, and fuel cell systems which use, as a fuel, hydrogen generated by the hydrogen generating facilities, as well as in various fields in which particularly small flow passages are controlled without consumption of electric power.

The invention claimed is:

1. A hydrogen generating facility comprising a reaction chamber accommodating a hydrogen generating reactant, and a pressure regulating valve, the pressure regulating valve including
a first pressure deformation portion which is deformable and which receives a pressure with the reaction chamber,
a second pressure deformation portion opposed to the first pressure deformation portion and which is deformable and which receives a predetermined pressure,
a first flow passage, a second flow passage, and a communication passage for allowing the first and second flow passages to communicate with each other, the first flow passage, the second flow passage, and the communication passage being disposed in a space between the first and second pressure deformation portions, and
a valve member having a connecting portion, which extends through the communication passage and connects the first pressure deformation portion and the second pressure deformation portion together, and having a valve element which is provided at the connecting portion and closes the communication passage when moved toward the second pressure deformation portion, and
wherein one of the first and second flow passages communicates with a supply source for supplying a reaction fluid, which reacts with the hydrogen generating reactant to generate hydrogen, to the reaction chamber, and the other of the first and second flow passages communicates with a flow passage communicating with the reaction chamber, and
when the pressure within the reaction chamber is lower than a predetermined value, the valve element does not close the communication passage, and the reaction fluid is supplied to the flow passage communicating with the reaction chamber, but when the pressure within the reaction chamber is equal to or higher than the predetermined value, the valve element closes the communication passage to stop a flow of the reaction fluid.

2. The hydrogen generating facility according to claim 1, wherein
the first and second flow passages are provided on a side of the first pressure deformation portion and on a side of the second pressure deformation portion, respectively, with a partition member provided between the first pressure deformation portion and the second pressure deformation portion being interposed between the first and second flow passages, and
the communication passage penetrates the partition member.

3. The hydrogen generating facility according to claim 1, further comprising
an isolation member for isolating the first pressure deformation portion and an interior of the reaction chamber from each other when the valve element moves toward the second pressure deformation portion to close the communication passage, and
wherein when the valve element closes the communication passage, the pressure from the interior of the reaction chamber to the first pressure deformation portion is cut off by the isolation member.

4. The hydrogen generating facility according to claim 1, wherein the predetermined pressure exerted on the second pressure deformation portion is one of, or a combination of two or more of, atmospheric pressure, a pressure exerted by a spring member, and a pressure from a pressurized fluid sealed up in a closed space.

5. A pressure regulating valve, comprising:
a first pressure deformation portion which is deformable and which receives a pressure on a fuel demand side;
a second pressure deformation portion opposed to the first pressure deformation portion and which is deformable and which receives a predetermined pressure;
a first flow passage, a second flow passage, and a communication passage for allowing the first and second flow passages to communicate with each other, the first flow passage, the second flow passage, and the communication passage being disposed in a space between the first and second pressure deformation portions;
a valve member having a connecting portion which extends through the communication passage and connects the first pressure deformation portion and the second pressure deformation portion together, and having a valve element which is provided at the connecting portion and closes the communication passage when moved toward the second pressure deformation portion; and
an isolation member for isolating the first pressure deformation portion and the fuel demand side from each other when the valve element moves toward the second pressure deformation portion to close the communication passage,
wherein when the pressure on the fuel demand side is lower than a predetermined value, the valve element does not close the communication passage, but when the pressure on the fuel demand side is equal to or higher than the predetermined value, the valve element closes the communication passage, and
wherein when the valve element closes the communication passage, the pressure from the fuel demand side to the first pressure deformation portion is cut off by the isolation member.

6. A fuel cell system comprising an anode chamber to be supplied with a fuel under control of a pressure regulating valve, the pressure regulating valve including:
a first pressure deformation portion which is deformable and which receives a pressure on a fuel demand side;
a second pressure deformation portion opposed to the first pressure deformation portion and which is deformable and which receives a predetermined pressure;
a first flow passage, a second flow passage, and a communication passage for allowing the first and second flow passages to communicate with each other, the first flow passage, the second flow passage, and the communication passage being disposed in a space between the first and second pressure deformation portions;
a valve member having a connecting portion which extends through the communication passage and connects the first pressure deformation portion and the second pressure deformation portion together, and having a valve element which is provided at the connecting portion and closes the communication passage when moved toward the second pressure deformation portion; and
an isolation member for isolating the first pressure deformation portion and the fuel demand side from each other when the valve element moves toward the second pressure deformation portion to close the communication passage,
wherein one of the first and second flow passages communicates with a fuel fluid supply source for supplying a fuel fluid comprising the fuel or a fuel generating material, and the other of the first and second flow passages communicates with a flow passage communicating with the fuel demand side,
wherein when the pressure on the fuel demand side is lower than a predetermined value, the valve element does not close the communication passage, and the fuel fluid comprising the fuel or the fuel generating material is supplied to the flow passage communicating with the fuel demand side, but when the pressure on the fuel demand side is equal to or higher than the predetermined value, the valve element closes the communication passage to stop a flow of the fuel fluid, and
wherein when the valve element closes the communication passage, the pressure from the fuel demand side to the first pressure deformation portion is cut off by the isolation member.

7. A fuel cell system comprising an anode chamber to be supplied with a fuel, and a pressure regulating valve, the pressure regulating valve including:
a first pressure deformation portion which is deformable and which receives a pressure on a fuel demand side;
a second pressure deformation portion opposed to the first pressure deformation portion and which is deformable and which receives a predetermined pressure;
a first flow passage, a second flow passage, and a communication passage for allowing the first and second flow passages to communicate with each other, the first flow passage, the second flow passage, and the communication passage being disposed in a space between the first and second pressure deformation portions;
a valve member having a connecting portion which extends through the communication passage and connects the first pressure deformation portion and the second pressure deformation portion together, and having a valve element which is provided at the connecting portion and closes the communication passage when moved toward the second pressure deformation portion, wherein one of the first and second flow passages communicates with a fuel fluid supply source for supplying a fuel fluid comprising the fuel or a fuel generating material, and the other of the first and second flow passages communicates with a flow passage communicating with the fuel demand side, wherein when the pressure on the fuel demand side is lower than a predetermined value, the valve element does not close the communication passage, and the fuel fluid comprising the fuel or the fuel generating material is supplied to the flow passage communicating with the fuel demand side, but when the pressure on the fuel demand side is equal to or higher than the predetermined value, the valve element closes the communication passage to stop a flow of the fuel fluid, wherein the fuel demand side is a reaction chamber for supplying the fuel to the anode chamber, and wherein the fuel fluid is the fuel generating material, and comprises a reaction fluid which reacts with a hydrogen generating reactant accommodated in the reaction chamber to generate hydrogen.

* * * * *